March 3, 1970   M. M. SCHUSTER ETAL   3,498,174
INHERENTLY TORQUE-LIMITED BOLT HAVING REMOVAL MEANS
Filed Nov. 19, 1968
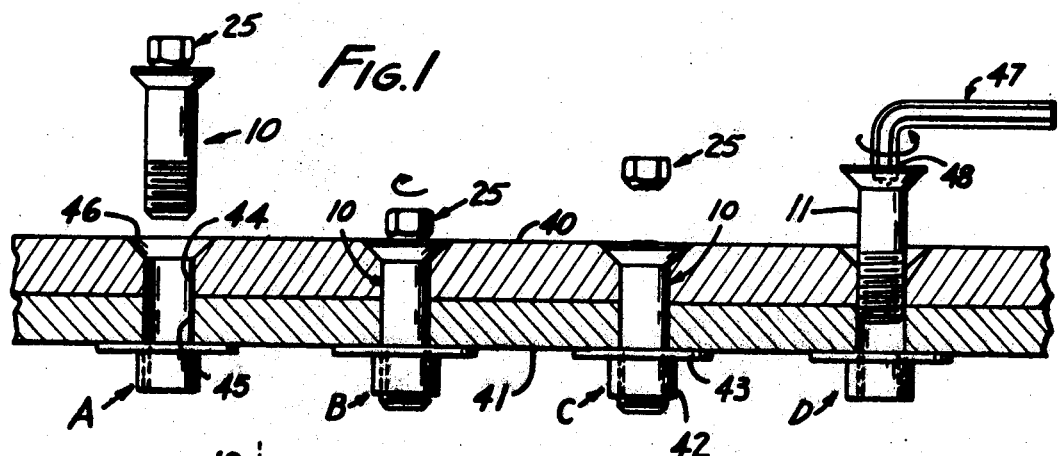
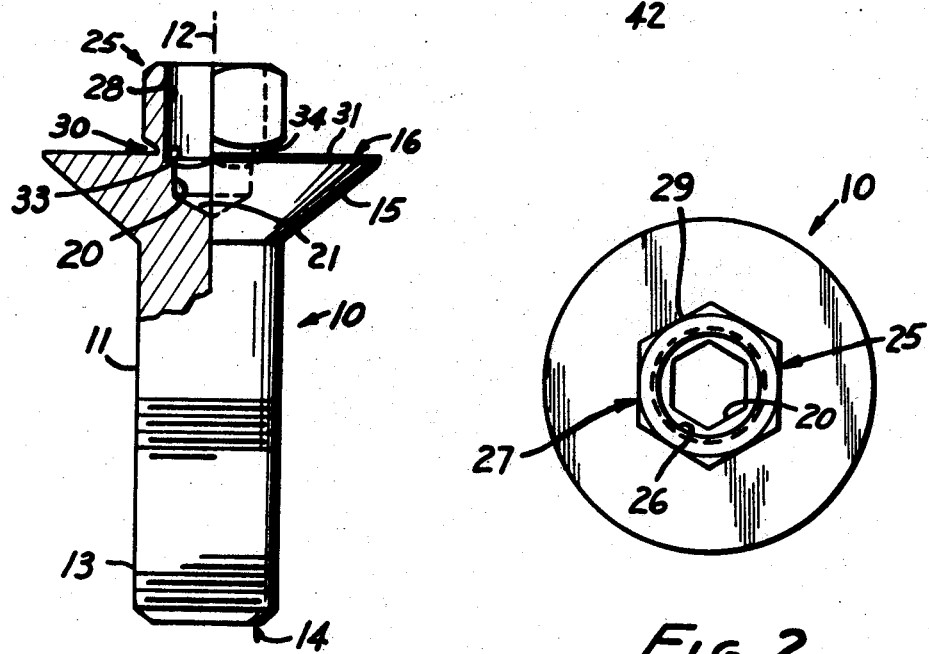
INVENTOR.
MICHAEL M. SCHUSTER,
EDWIN E. HATTER
BY
ATTORNEYS.

United States Patent Office 3,498,174
Patented Mar. 3, 1970

---

3,498,174
INHERENTLY TORQUE-LIMITED BOLT HAVING REMOVAL MEANS
Michael M. Schuster, Inglewood, and Edwin E. Hatter, Torrance, Calif., assignors to Hi-Shear Corporation, Torrance, Calif., a corporation of California
Filed Nov. 19, 1968, Ser. No. 776,876
Int. Cl. F16b *31/02*
U.S. Cl. 85—61                                                         10 Claims

ABSTRACT OF THE DISCLOSURE

An inherently torque-limited bolt having a shank, a thread, and two ends. A hollow drive body is joined to one end by a shear section of least torsional shear strength so as to shear and to release the drive body from the shank at a predetermined torque. The drive body has an inner and an outer boundary, one of which is non-circular for engagement by a torque tool, whereby torque up to the predetermined level can be exerted to install the bolt, after which the drive body shears off and no further torque can be applied. A non-circular recess is formed in the same end as the drive body. The recess is accessible through the drive body in order to receive a torque tool for removal of the bolt both before and after installation without exerting torque on the drive body.

---

This invention relates to an inherenetly torque-limited bolt provided with means for its removal.

Inherently torque-limited fastener means are known in the art. The usual property of such means is that of reliance on the shearing-off of a drive body to establish the torque level to which another body is set, and to prevent the exertion of additional torque after setting. Such means ordinarly share the disadvantage of not having a provision for removal of the fastener after setting, and often such fasteners require considerable destructive procedures in order for them to be removed.

It is an object of this invention to provide an inherently torque-limited bolt provided with means for its removal.

According to this invention, the bolt comprises a cylindrical shank which has a central axis, a first and a second end, and a non-circular axial recess extending into one of these ends for engagement by a torque tool. An external peripheral thread is formed adjacent to one of the ends. A hollow drive body is defined by an inner and an outer boundary, the boundaries being coaxial on the central axis of the shank, and one of them is non-circular for engagement by a torque tool. A shear section joins one end of the drive body to that end of the shank in which the recess is formed. The shank, shear section and drive body form an integral structure, the shear section forming the region of least torsional shear strength as to torque exerted between the drive body and the shank. The drive body will thereby torque off when the predetermined torque is applied.

The recess is accessible through the passage formed within the inner boundary of the drive body and the shear section, and enables the bolt to be removed by torque exerted by a torque tool either before or after the shank is installed without exerting torque on the drive body.

The above and other features of this invention will be fully understood from the following detailed description and the accompanying drawings in which:

FIG. 1 is a side elevation, partly in cutaway cross-section, showing the installation and removal of the fastener of the invention;

FIG. 2 is a top view of FIG. 3; and
FIG. 3 is a side elevation of FIG. 2, partly in cutaway cross-section.

With initial reference to FIG. 3, there is shown a fastener 10 according to the presently preferred embodiment of the invention. It includes a cylindrical shank 11 with a central axis 12. The shank is cylindrical and carries an external peripheral thread 13 adjacent a first end 14 thereof. Preferably, but not necessarily, a head 15 forms a portion of the shank at the second end 16 thereof. The head is shown as a countersink type, but it will be understood that this invention is applicable to heads of other configurations, as well as to unheaded shank fasteners.

A non-circular axial recess 20 is formed in the second end of the shank. Preferably, it is hexagonal so as to receive a wrench for purposes yet to be described. The conical bottom portion 21 of the recess will be recognized as a typical drill point relief.

A drive body 25 is hollow and formed by an inner boundary 26 and an outer boundary 27. The inner boundary forms a central passage 28. One of the boundaries is non-circular and, in the illustrated device, it is the outer boundary which has a plurality of surfaces 29 which form a hexagonal pattern for engagement by a common torque tool such as a wrench head. Preferably, but not necessarily, the inner boundary is circular and extends axially to a shear section 30 which may on the inside comprise a continuation of this inner boundary, and should extend at least to the upper surface 31 of the shank.

The shear section joins the drive body to the shank at the same end which receives recess 20. The drive body, shear section and recess are preferably coaxial on said central axis. Conveniently, the shear section has an inner boundray 33 which, as stated, is preferably a continuation of inner boundary 26 of the drive body. Its outer boundary is preferably formed by a circular groove 34 which reduces the shear section to a cross-sectional area which forms one of the parameters of the inherent torque limitation of the fastener. The shear section also forms the region of least torsional shear strength between the drive body and the shank. As shown, the shear section is a continuous circular annulus which is the most convenient form to produce, but it will be understood that non-circular forms, both inside and out, and continuous or discontinuous, may be used instead, all being within the scope of the invention. It will further be seen that recess 20 is accessible through passage 28 so that it may be contacted by a torque tool both before and after installation.

The relationships between the strength of material and shape and size of the shear area are of no importance to the instant invention, and will be readily understood by persons skilled in the art.

FIG. 1 shows a plate 40 intended to be attached to a nut plate 41 by fastener 10 according to the invention. The nut plate includes a group of nuts 42 held to plate 41 by retainers 43 in accordance with known constructions. Aligned holes 44, 45 are formed in plates 40, 41, and a countersink 46 is provided in the holes 44 to receive the countersink head.

At position A in FIG. 1, fastener 10 is about to be inserted into the holes in the plates. As shown in position B, the same fastener has been tightened down by a torque tool (not shown but which may be such as a socket wrench or the like) to a condition just short of the predetermined torque level. In position C, the same fastener has been troqued down to its inherent torque level, and the drive body has been released from the shank by virtue of the fracture of the shear section. In position D, the fastener is shown being removed by a torque tool 47 having a hexagonal perimeter 48 which fits into recess 20. This same tool 47 could have been inserted into recess 20 through the drive body before it was sheared off, should the intent to set the fastener have been aborted.

It will thereby be seen that this device provides means for removal of an inherently torque-limited fastener without the complications of having to drill it out or therewise conduct destructive operations. Such means does not interfere with the inherent torque level at which the fastener will remain set, and is not deleterious to the fastener in any way.

We claim:

1. An inherently torque-limited bolt comprising: a cylindrical shank having a central axis, a first and a second end, an a non-circular axial recess extending into one of said ends for engagement by a torque tool; an external peripheral thread adjacent to one of said ends; a hollow drive body defined by an inner and an outer boundary, said boundaries being coaxial on said central axis, and one of them being non-circular for engagement by a torque tool; a shear section joining one end of the drive body to that end of the shank in which the recess is formed, the shank, shear section and drive body forming an integral structure and the shear section forming the region of least torsional shear strength as to torque exerted between the drive body and the shank whereby to shear and release the drive body from the shank at a predetermined torque, the recess being axially accessible and engageable through the passage formed by the inner boundary and the shear section, the recess enabling the bolt to be removed by torque exerted by a torque tool inserted therein whether or not the drive body is attached to the shank.

2. An inherently torque-limited bolt according to claim 1 in which the shear section includes a circular external groove contiguous to the adjacent end of the shank.

3. An inherently torque-limited bolt according to claim 1 in which the outer boundary is non-circular, the inner boundary is circular into the shear section, and the shear section includes an outer circular groove.

4. An inherently torque-limited bolt according to claim 3 in which the said circular groove is contiguous to the adjacent end of the shank.

5. An inherently torque-limited bolt according to claim 4 in which the outer boundary and recess are both hexagonal.

6. An inherently torque-limited bolt according to claim 1 in which the recess extends into the second end of the shank, the thread is adjacent to the first end of the shank, and a head forms the second end of the shank.

7. An inherently torque-limited bolt according to claim 6 in which the shear section includes a circular external groove contiguous to the head.

8. An inherently torque-limited bolt according to claim 6 in which the outer boundary is non-circular, the inner boundary is circular into the shear section, and the shear section includes an outer circular groove.

9. An inherently torque-limited bolt according to claim 8 in which the said circular groove is contiguous to the head.

10. An inherently torque-limited bolt according to claim 9 in which the outer boundary and recess are both hexagonal.

References Cited

UNITED STATES PATENTS

| 2,855,610 | 10/1958 | Moore | 85—45 X |

FOREIGN PATENTS

| 959,219 | 9/1949 | France. |
| 684,821 | 12/1952 | Great Britain. |
| 867,643 | 5/1961 | Great Britain. |

RAMON S. BRITTS, Primary Examiner